United States Patent
Szuggars et al.

(10) Patent No.: US 11,163,127 B2
(45) Date of Patent: Nov. 2, 2021

(54) PROTECTIVE CONDUIT FOR HIGH-POWER LASER APPLICATIONS IN LIGHT GUIDE CABLES

(71) Applicant: II-VI Delaware, Inc, Wilmington, DE (US)

(72) Inventors: Marko Szuggars, Kleinmachnow (DE); Gunnar Köhler, Potsdam (DE)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/589,722

(22) Filed: Oct. 1, 2019

(65) Prior Publication Data
US 2021/0096313 A1    Apr. 1, 2021

(51) Int. Cl.
   G02B 6/44    (2006.01)
   C08K 3/04    (2006.01)

(52) U.S. Cl.
   CPC .............. *G02B 6/443* (2013.01); *C08K 3/045* (2017.05); *C08K 2201/005* (2013.01); *C08K 2201/011* (2013.01)

(58) Field of Classification Search
   CPC ... G02B 6/443; C08K 3/045; C08K 2201/005
   See application file for complete search history.

(56) References Cited

U.S. PATENT DOCUMENTS

| 568,323 | A | * | 9/1896 | Acheson | ................. C01B 32/00 423/448 |
| 5,438,474 | A | * | 8/1995 | MacPherson | .......... G02B 6/443 361/158 |
| 2004/0258371 | A1 | | 12/2004 | Buxbaum et al. | |
| 2011/0211795 | A1 | | 9/2011 | Busboom et al. | |
| 2020/0397453 | A1 | * | 12/2020 | McGowan | ......... A61B 17/2202 |

FOREIGN PATENT DOCUMENTS

| DE | 202005018553 U1 | 1/2006 |
| DE | 102005050623 A1 | 4/2007 |

OTHER PUBLICATIONS

Office Action in counterpart DE Application 102019129194.1 dated May 20, 2020, 6-pgs.

* cited by examiner

*Primary Examiner* — Sung H Pak
(74) *Attorney, Agent, or Firm* — Blank Rome LLP

(57) ABSTRACT

A protective conduit for high power laser applications in light guide cables and provides a protective conduit that surrounds a light guiding fiber for high-power laser applications in light guide cables, wherein the protective conduit includes at least one plastic laser safety layer filled with at least one allotrope of carbon or filled with cork, chipped wood, wood, or wood powder, wood particles.

20 Claims, 5 Drawing Sheets

PROTECTIVE CONDUIT FOR HIGH-POWER LASER APPLICATIONS IN LIGHT GUIDE CABLES

CROSS-REFERENCE TO RELATED APPLICATIONS

None.

BACKGROUND OF THE INVENTION

Field of the Invention

The invention relates to a protective conduit for high power laser applications in light guide cables.

Brief Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Class 4 high-power laser applications use laser power which is always dangerous for health and life. Damage (such as fiber breakage) within light guiding systems such as laser light cables might release dangerous amounts of laser light causing irreversible damage to the human body. Therefore, for high-power fiber optic cables a protection against uncontrolled leaking laser radiation is prescribed for reasons of safety at work. The use of a safety system to monitor the breakage of fiber optic cables is one way of protecting against the unintended release of laser radiation. In case of fiber breakage, the laser safety system has to securely switch off the laser within a few milliseconds to avoid the leakage of laser radiation. To prevent dangerous emission of laser light at any time the fiber is enclosed said cable in a protective hose that is light proof and solid against high power laser light. The protective hose acts as a firewall and absorbs the laser light until the safety circuit has securely switched off the laser.

The prior art discloses basically two concepts for the structure of a protective conduit:
a. a sheath combining twisted or spiral metal tubing or a covering steel mesh; and
b. a sheath of a combination of a copper braiding with black, grey or transparent plastics.

The metal jacket must guarantee that the conduit is lightproof. In some embodiments several metal layers are used to increase their effect. The copper braiding combined with colored plastic is an alternative for shielding the environment against exiting laser radiation. Both approaches have in common that the laser light guiding fiber is arranged centrally in the cable, wherein a transparent polymer or plastic is surrounding the light guide fiber. The transparent polymer or plastic is surrounded by light absorbing layers.

SUMMARY OF THE INVENTION

An object of the present invention is to provide a lightproof protective conduit for a high-power laser light cable that is solid against the high-power laser light.

The present invention provides a protective conduit that surrounds a light guiding fiber for high-power laser applications in light guide cables, wherein the protective conduit includes at least one plastic laser safety layer filled with at least one allotrope of carbon.

A further aspect relates to the plastic laser safety layer that may consist of an allotrope of carbon filled thermoplastic polymer selected from the group comprising TPU, TPE and PTFE.

It is envisaged that the allotrope of carbon can be present in form of particles or clusters in a size range from 10 nanometers up to 300 micrometers.

In a further embodiment, the allotrope of carbon can be present in form of either graphite, diamond or a member of the fullerene structural family, comprising buckyballs, buckytubes or carbon nanobuds.

It is further intended that the thermoplastic polymer laser safety layer may contain up 60% (w/w) of an allotrope of carbon.

In an embodiment of the protective conduit, the thermoplastic polymer laser safety layer may have a thickness of 0.2 to 7 mm.

A further aspect of the invention relates to the thermoplastic polymer laser safety layer that surrounds an inner low friction tube made of thermoplastic polymer comprising TPU, TPE or PTFE.

Another aspect of the invention relates to a protective conduit that surrounds a light guiding fiber for high-power laser applications in light guide cables, wherein the protective conduit includes at least one plastic laser safety layer filled with cork, chipped wood, wood, or wood powder, wood particles.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The object of the invention is achieved by the features of the independent claims. Further embodiments are claimed in the dependent claims.

The invention provides an inner tube made of a low-friction plastic (for instance PTFE/polytetrafluoroethylene) surrounded by at least one laser safety layer of a thermoplastic polymer such as TPU (thermoplastic polyurethane) that contains allotropes of carbon, e.g. graphite particles. The surrounding laser safety layer might also be applied without using a transparent inner tube. In normal situation these components do not significantly affect the flexibility of the conduit.

If laser light should escape from the fiber, it is effectively absorbed by the carbon-containing compounds. However, in case of fiber breakage much more power is escaping leading to much higher temperatures and a pyrolytic reaction. The carbon-containing filler material becomes heated by laser radiation, dissolves, evaporates and releases the carbon. The previously bound carbon that will be dissolved as aerosol or carbon powder will absorb the laser radiation completely. As high-purity carbon is very stable it will be heat-resistant up to at least 3000 degC and does almost not exothermically react with oxygen up to that temperature. Therefore, it does not add further heat to the protective conduit but absorbs the laser energy. Furthermore, pure carbon does not melt under atmospheric pressure but it sublimes at about 3,630 degC. Its endothermic phase-change reactions absorb the laser power safely, so that the internal safety circuit has sufficient time to switch off the laser. Experiments show that such a configuration can absorb more than 26 kW of laser light for more than one hundred milliseconds. Without these carbon-containing compounds, the escaping laser light would cut through the conduit within a few milliseconds, which is too fast to securely switch of the laser safety circuit. Therefore, a protective conduit according to the invention is able to stand by far higher temperatures than a protective conduit made or covered with steel or copper.

Figure 1:
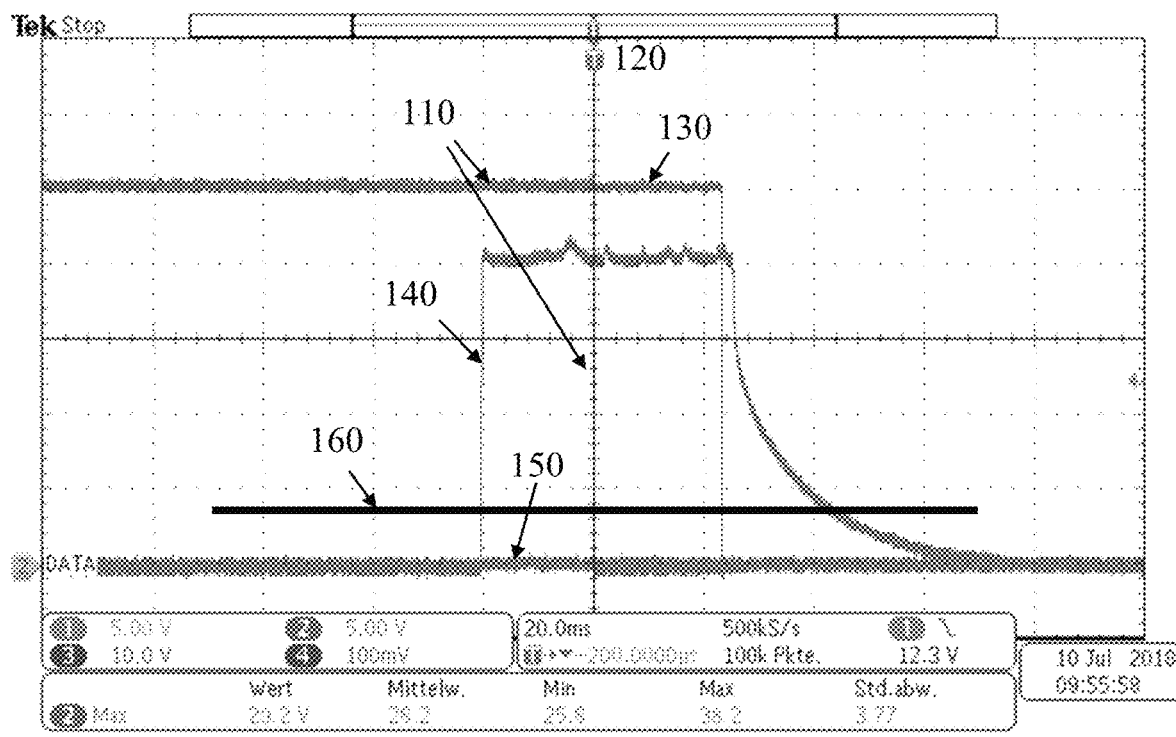
FIG. 1 shows measured signals at approx. 26 kW laser power using a protective conduit according to the invention.

FIG. 1 shows exemplified experimental results achieved with a protective conduit according to the invention. It shows an oscilloscope screen shot of the measured signals during a simulated fiber break at 26 kW laser power. The signal (110) represents the safety sensor cable with its laser-caused interruption at time (120) minus 12 milliseconds. The minus 12 milliseconds time delay is caused by the switching time of the laser safety switch used in this setup. Thereupon the laser switch-off signal is further delayed by 21 milliseconds (130). Its drop triggers the laser to switch off after a total delay time of 33 milliseconds. The difference between 12 minus milliseconds and the starting point of the laser radiation-on signal is given by the time need to interrupt the laser safety sensor cable. After a short time delay of approximately 3 milliseconds (caused by the laser safety control system), the falling laser radiation signal indicates the laser has been switched off (140). At any time, the TROS-sensor signal (150) stays far below the allowed maximum value (160) specified by the rules of hazardous radiation (according to TROS) applicable to safety at work. As the protective conduit according to the invention is completely light-tight the signal does not show any deviations from its noise level.

Figure 2:
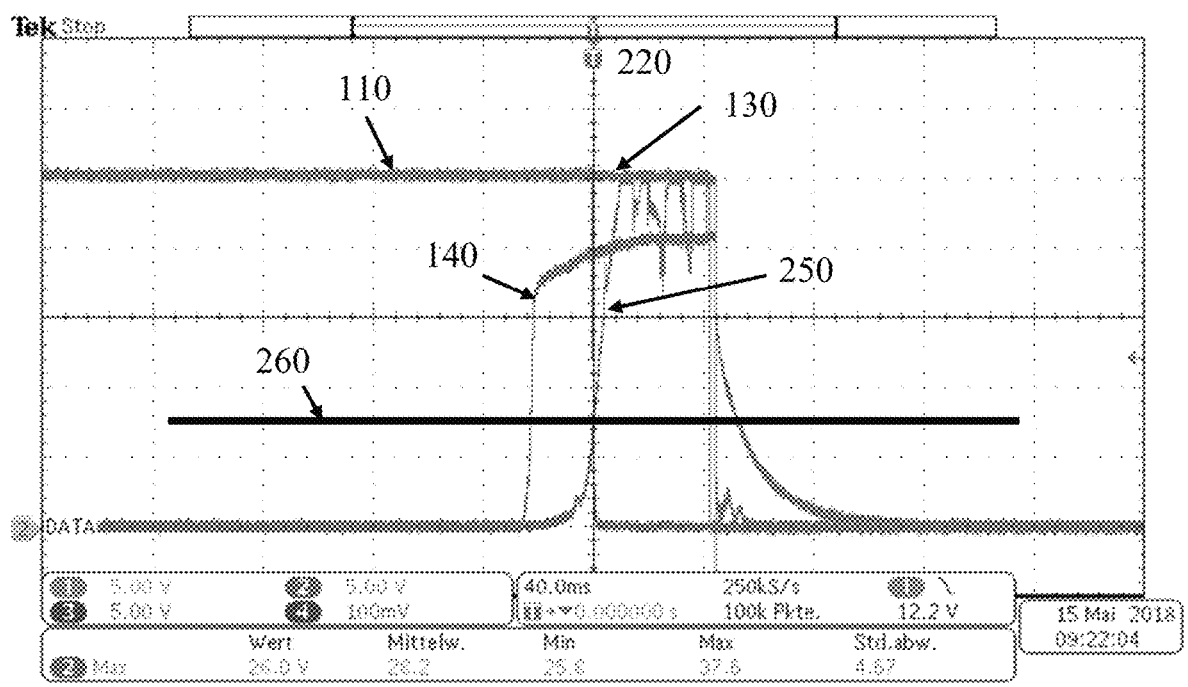
FIG. 2 shows measured signals at approx. 24 kW laser power using a protective conduit according to previous art.

FIG. 2 shows exemplified experimental results achieved with a protective conduit according to previous art. The signal numbers 110, 130, 140 used are the same as in FIG. 1. The TROS-sensor signal (250) exceeds the maximum value (260) specified by the rules of hazardous radiation (according to TROS) applicable to safety at work at time (220).

Figure 3:
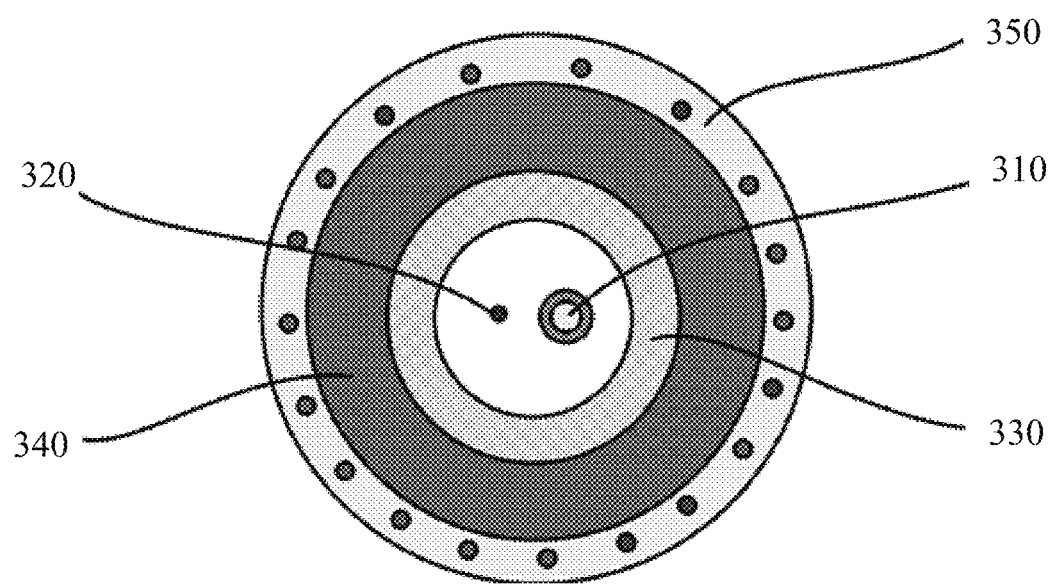
FIG. 3 shows a cross section through a protective conduit according to the invention.

FIG. 3 shows a cross section through a possible variation of a protective conduit according to the invention with the light guiding fiber (310), monitored by a Laser safety sensor cable (320), concentrically surrounded by an inner tube (330), concentrically surrounded by a laser safety layer (340) and covered by a Mechanical function layer with strain relief and to avoid abrasion (350).

Figure 4:
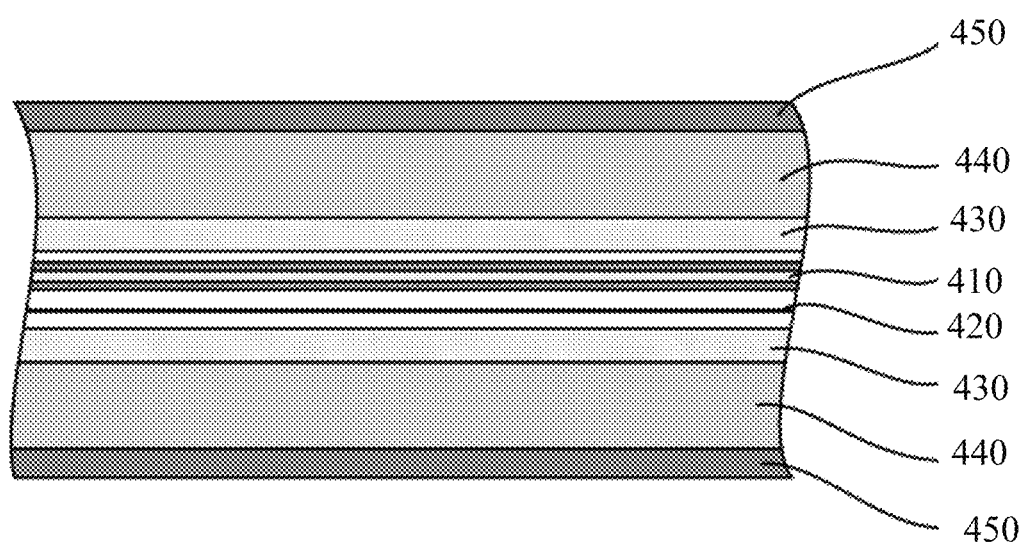
FIG. 4 shows a longitudinal section through a protective conduit according to the invention with fine particles.

FIG. 4 shows a longitudinal section through a possible variation of a protective conduit according to the invention with the light guiding fiber (410), monitored by a Laser safety sensor cable (420), concentrically surrounded by an inner tube (430), concentrically surrounded by a laser safety layer filled with fine particles of allotrope of carbon such as graphite (440) and covered by a mechanical function layer with strain relief and to avoid abrasion (450).

Figure 5:
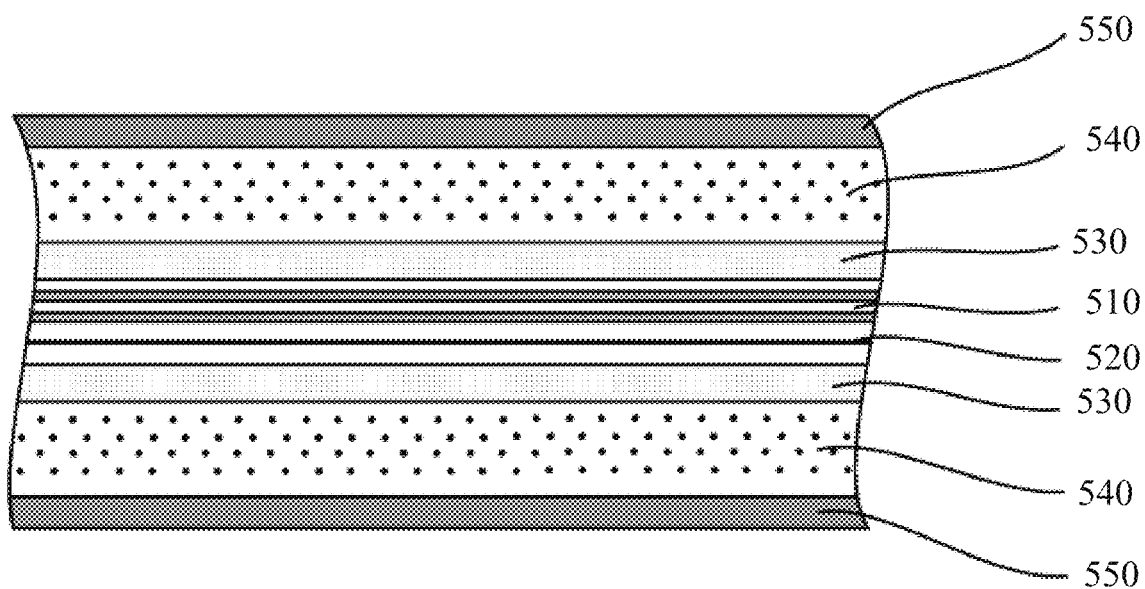
FIG. 5 shows a longitudinal section through a protective conduit according to the invention with coarse particles.

FIG. 5 shows a longitudinal section through a possible variation of a protective conduit according to the invention with the light guiding fiber (510), monitored by a Laser safety sensor cable (520), concentrically surrounded by an inner tube (530), concentrically surrounded by a laser safety layer filled with coarse particles of allotrope of carbon that form discrete clusters homogeneous embedded into a transparent polymer matrix (540) and covered by a mechanical function layer with strain relief and to avoid abrasion (550). This setup is particularly advantageous as it allows the laser radiation to penetrate deeper into the laser safety layer and release more carbon at the same time.

The present invention provides a protective conduit that solid for lasers with an output of at least 20 kW for a beam duration of at least 30 milliseconds after detecting fiber breakage. At the same time, the protective hose according to the invention is far more light weight and flexible than conventional metal based conduits—especially in application where torsion needs to be applied to the protective conduit, such as 6 axis robot applications.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A protective conduit that surrounds a light guiding fiber for high-power laser applications in light guide cables, wherein the protective conduit includes at least one plastic laser safety layer having a plastic material filled with at least one allotrope of carbon, the at least one allotrope of carbon being in an amount and a configuration sufficient to absorb substantially all of a laser power escaping from the light guiding fiber due to breakage for at least a predetermined amount of time.

2. The protective conduit of claim 1, wherein the plastic material for the plastic laser safety layer consists of a thermoplastic polymer selected from the group comprising TPU, TPE and PTFE.

3. The protective conduit of claim 1, wherein the at least one allotrope of carbon is present in form of particles or clusters in a size range from 10 nanometers up to 300 micrometers.

4. The protective conduit of claim 1, wherein the at least one allotrope of carbon is present in form of either graphite, diamond or a member of the fullerene structural family, comprising buckyballs, buckytubes or carbon nanobuds.

5. The protective conduit of claim 1, wherein the at least one plastic laser safety layer contains up 60% (w/w) of the at least one allotrope of carbon.

6. The protective conduit of claim 1, wherein the at least one plastic laser safety layer has a thickness of 0.2 to 7 mm.

7. A protective conduit that surrounds a light guiding fiber for high-power laser applications in light guide cables, wherein the protective conduit includes at least one plastic laser safety layer having a plastic material filled with cork, chipped wood, wood, wood powder, or wood particles, the at least one plastic laser safety layer being configured to protect against laser power escaping from the light guiding fiber due to breakage.

8. The protective conduit of claim 1, further comprising an inner low friction tube surrounded by the at least one safety layer and made of thermoplastic polymer.

9. The protective conduit of claim 1, further comprising a mechanical layer surrounding the at least one safety layer and being configured to provide strain relief.

10. The protective conduit of claim 9, wherein the inner low friction tube made of the thermoplastic polymer comprises TPU, TPE or PTFE.

11. A fiber optic cable for high power laser light, the cable comprising:
   a fiber for guiding the high power laser light; and
   a protective conduit surrounding the fiber, the protective conduit including at least one safety layer having a plastic material filled with at least one allotrope of carbon, the plastic material being configured to decompose in a pyrolytic reaction in response to the high power laser light escaping from the fiber and being configured to release the at least one allotrope of carbon in an amount and a configuration sufficient to absorb the high power laser light for at least a predetermined amount of time.

12. The cable of claim 11, wherein the plastic material comprises a thermoplastic polymer, TPU, TPE, or PTFE.

13. The cable of claim 11, wherein:
   the at least one allotrope of carbon is present in form of particles or clusters in a size range from 10 nanometers up to 300 micrometers; and/or
   the at least one allotrope of carbon is present in form of either (i) graphite, (ii) diamond, or (iii) a member of the fullerene structural family comprising buckyballs, buckytubes, or carbon nanobuds.

14. The cable of claim 11, wherein the fiber spans an entire length of the at least one safety layer, or wherein the at least one safety layer is spaced away from an end of the fiber.

15. The cable of claim 11, wherein the at least one safety layer contains up 60% (w/w) of the at least one allotrope of carbon.

16. The cable of claim 11, wherein the at least one safety layer has a thickness of 0.2 to 7 mm.

17. The cable of claim 11, wherein the at least one allotrope of carbon absorbs the high power laser light in an endothermic phase-change reaction.

18. The cable of claim 11, wherein the protective conduit further comprising an inner low friction tube made of thermoplastic polymer disposed in the cable between the fiber and the at least one safety layer.

19. The cable of claim 11, wherein the protective conduit further comprises a mechanical layer surrounding the at least one safety layer and being configured to provide strain relief.

20. The cable of claim 11, further comprising a sensor cable disposed adjacent the fiber and surrounded by the protective conduit, the sensor cable configured to conduct a signal for detecting fiber breakage.

\* \* \* \* \*